United States Patent [19]
Bark et al.

[11] 3,735,474
[45] May 29, 1973

[54] METHOD OF SECURING SEPARATOR IN CLUTCH DISC

[75] Inventors: Nils-Eric G. Bark, Lake Bluff; Karl Kordas, Mudelein, both of Ill.

[73] Assignee: International Harvester Company, Chicago, Ill.

[22] Filed: Feb. 12, 1971

[21] Appl. No.: 114,928

Related U.S. Application Data

[62] Division of Ser. No. 837,146, June 27, 1969, Pat. No. 3,584,720.

[52] U.S. Cl. .............................. 29/451, 192/107 R
[51] Int. Cl. ............................................ B23p 11/02
[58] Field of Search ....................... 29/451, 522, 523; 192/107 R

[56] References Cited

UNITED STATES PATENTS

| | | | |
|---|---|---|---|
| 2,948,041 | 8/1960 | Evans | 29/522 UX |
| 2,990,828 | 7/1961 | Hoerer | 29/522 UX |
| 3,104,432 | 9/1963 | Peterson | 29/451 UX |
| 3,317,981 | 5/1967 | Drees | 29/523 X |
| 3,455,423 | 7/1969 | Lindquist | 192/107 R |
| 3,561,095 | 2/1971 | Bergmann | 29/451 |

*Primary Examiner*—Charlie T. Moon
*Attorney*—Noel G. Artman

[57] ABSTRACT

A multiple disc clutch pack for transmitting and interrupting power flow between a drive member and a driven member. Alternating discs axially shiftable, but non-rotatably secured to one of the members, have elastomeric elements extending into engagement with adjacent discs on the said member to separate the discs when the power flow therethrough is interrupted, and are compressible to permit frictional engagement of all the discs when the power is being transmitted.

2 Claims, 3 Drawing Figures

PATENTED MAY 29 1973 3,735,474
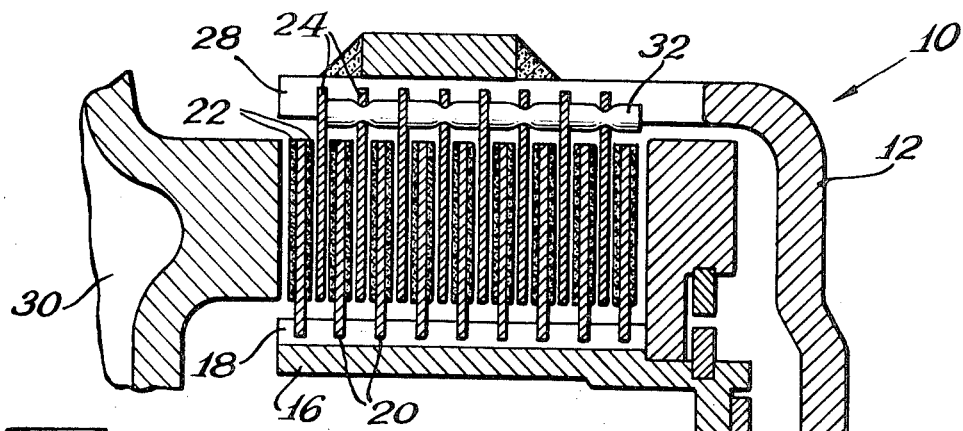
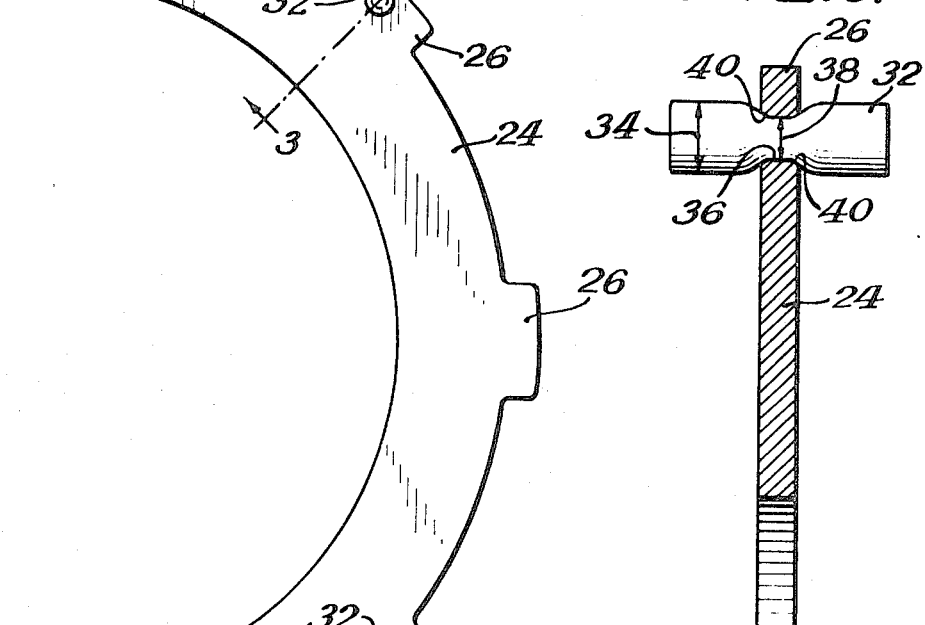
Inventors
Nils-Eric G. Bark
Karl Kordas
Ronald C. Kamp Atty

METHOD OF SECURING SEPARATOR IN CLUTCH DISC

This application is a division of applicants' copending application Ser. No. 837,146 filed June 27, 1969 now U.S. Pat. No. 3,584,720.

BACKGROUND AND SUMMARY OF THE INVENTION

Conventional clutch packs encounter two problems. When the clutch pack is free spinning, i.e., not transmitting power, the discs tend to drag on each other and build up heat. To some extent this can be compensated by flooding the pack with cooling oil. The second problem is one termed "flutter failure." The drum which supports one set of plates or discs tends to wobble relative to the shaft which supports the other set of discs. While the exact cause of the wobble is not definitely established, it is believed that the tolerances in the bearings rotatably mounting the drum is the significant factor. Whatever the reason, it is known that for a given geometry clutch pack, the discs will become excited and tend to flutter at certain speeds when the clutch is free spinning. When the discs flutter, they do not remain parallel to each other and hence come into spot or point contact with adjacent discs. Such small areas of contact concentrates the heat build-up and often flooding with cooling oil is insufficient to prevent burning of the discs in these areas. Severe cases of flutter can elevate the temperature in the areas of contact sufficiently high to actually weld the plates together.

Many attempts have been made to provide a means for separating the plates during free spinning. All of the prior art clutch pack separators, however, have suffered from at least one of the following deficiencies: restricting or sacrificing frictional area; requiring moving contact between the separator and the discs during free spinning; imposing a frictional load on the lining material from the separator during free spinning; or have utilized a separator having a physical arrangement and located such that it is capable of damaging the lining material on the discs.

It is an object of this invention to provide a method for installing a separator in a disc of a clutch pack.

FIG. 1 is a cross-sectional view of a portion of a clutch pack incorporating the present invention, FIG. 2 is a plan view of a single disc, with a portion broken away, showing the spacer of the present invention secured thereto, and FIG. 3 is a cross-sectional view, to a larger scale, taken on lines 3—3 of FIG. 2.

PREFERRED EMBODIMENT OF THE INVENTION

Since it is intended that the present invention may be incorporated into conventional clutch packs already in production, FIG. 1 illustrates a portion of such a conventional clutch pack, indicated generally at 10. An outer member or drum 12 is mounted in bearings, (not shown), for rotation about the axis 14. An inner sleeve or shaft 16 is also journalled for rotation about the axis 14. One of the members 12 and 16 is the driving member and the other is the driven member. The shaft member 16 is provided with an external spline 18 which permits the mounting of a plurality of plates 20. The plates 20 are provided with internal diameters having a shape complementary with the spline 18 and mount on the spline 18 so that the plates are axially shiftable, but non-rotatable relative to the member 16.

Frictional material 22 is secured to each face of the plates 20. Typically, the plate 20 is formed of a steel material and the facing of frictional material 22 is formed of sintered bronze. Interleaved between the plates 20 are a plurality of discs 24. Each disc is provided with a plurality of tangs 26, as shown in FIG. 2, which tangs are engageable with complementary slots 28 formed on the interior of the drum 12. The engagement of the tangs 26 with the slots 28 permit the axial shifting of the discs 24 relative to the drum 12 while prohibiting relative rotation between the two. An actuator means 30, which customarily takes the form of a hydraulically actuated piston means, is moveable between the disengaged position, such as shown in FIG. 1, wherein the discs are free to rotate relative to the plates, and an engaged position wherein the plates and discs are forced into frictional engagement. In the engaged position power will be transmitted between the two members 12 and 16, whereas in the disengaged position power flow between the two members will be interrupted.

A separator or spacer 32 is provided on every other one of the discs. These spacers are made of an elastomeric material capable of withstanding high temperature levels, such as fluorocarbon rubber, which is sold by DuPont under the trademark Viton.

In order to preclude cocking or side tilting of the discs, it is desirable to install a plurality of such spacers on each one of the alternate discs equipped with spacers and to locate the spacers so that they are equiangularly arranged around the periphery of the discs, as shown in FIG. 2. The tang 26 of each disc does not make any contribution toward the friction engagement between the discs 26 and the plates 24, and hence it is highly advantageous to position the spacers 24 on the tang 26.

In this location, the spacers do not diminish the contact area available for frictional engagement. Each spacer 32 extends from the free surface of each alternating disc into contact with the adjacent disc. Since the discs 24 are all moveable in rotational unison with the drum 12, there is no relative movement between the discs 24, and hence, there is no relative rotational movement between the free end of the spacer and the adjacent disc. Each spacer extends beyond the side of the disc to which it is attached by an amount at least equal to the thickness of the adjacent plate 20 and preferable to insure minimum drag during free spinning, should extend from the side of the supporting disc a distance between .014 to .024 inch greater than the adjacent plate's thickness.

When the actuator means 30 moves to the right, as viewed in FIG. 1, to engage the clutch pack, the discs and plates will be forced into tight contact. This will cause the elastomeric material to be compressed. As this material is compressed, each spacer will be shortened in length and increased in diameter or "buttoned up." To make sure that the adjacent plates do not cut the spacers under this "buttoned up" condition, each spacer must be positioned radially on the tang a distance sufficient to preclude contact with the plates under the maximum increased diameter conditions. That is, allowing for the maximum permissible wear on the plates and discs, which creates conditions for maximum increase in diameter of the spacer, the spacer should be positioned radially outward on the tang a distance sufficient to clear the plates.

While the spacers may take a variety of shapes and may be secured to the tang in a variety of ways, it is preferred that the spacer have the shape of a cylinder of substantially constant diameter, in its relaxed state, and that it be secured to the tang by trapping it in an opening in the tang of smaller diameter than the cylinder. As shown in FIG. 3, the spacer 32 has the form of a cylinder with a diameter 34. The opening 36 formed in the tang 26 has a diameter 38 which is smaller than the diameter 34. The difference in diameter need not be substantial because the "button up" effect resulting from compression of the plates, increases the diameter of the cylinder even more and tends to hold the cylinder within the opening 36. A bevel or chamfer 40 is formed on each end of the opening 36 to minimize the possibility of the spacer being cut when it is "buttoned up" during compression.

The placement of the cylindrical spacer 32 in the opening 36 is achieved in the following manner.

A taper is formed on one end of a cylindrical rod of elastomeric material; the taper being sufficiently long to permit it to be inserted through the opening 36 and grasped on the other side. Once the tapered portion is grasped, a tension force is applied to the rod, which force must be sufficient to elongate the rod and reduce its diameter to be substantially equal to the diameter of the opening 36. While the rod is so tensioned, it is moved axially of the opening 36 to a position in which a full diameter portion extends a substantial distance on either side of the disc 24. The tension force can then be relaxed and the rod cut to provide a full diameter cylinder portion extending from each side of the disc a distance at least equal to the thickness of the adjacent plate and preferably .014 to .024 inch greater than that plate's thickness.

While applicant has shown and described one form the invention may take and has described one method for assembling it, it is to be understood that various modifications may be made in either the structure or the method without departing from the spirit of the invention.

What is claimed is:

We claim:

1. The method of securing an elastomeric spacer element in a clutch disc comprising the steps of:

forming a taper on one end of a cylindrical elastomeric element;

forming a hole in the disc having a diameter smaller than the diameter of said element in its relaxed state;

inserting the tapered end of said element through said hole;

exerting a tension force on both ends of said element to reduce its diameter so that it is smaller than the diameter of said hole; simultaneously positioning said element in said hole so that a full diameter portion of said element extends beyond each side of said hole; removing the tension force; and cutting said element so that it extends a substantially equal distance beyond each side of said disc.

2. The method of securing an elastomeric spacer in a disc of a clutch pack comprising the steps of:

forming a taper on one end of a cylindrical elastomeric spacer element;

forming a hole in the disc having a diameter smaller than the diameter of said element in its relaxed state;

forming a chamfer on each end of said hole; inserting the tapered end of said element through said hole;

exerting a tension force on both ends of said element to reduce its diameter so that it is smaller than the diameter of said hole;

simultaneously positioning said element in said hole so that a full diameter portion of said element extends beyond each side of said hole; removing the tension force; and cutting each end of said element so that it extends a substantially equal distance beyond and has a constant diameter on each side of said disc.

* * * * *